United States Patent
Maheshwari et al.

(10) Patent No.: US 10,216,638 B2
(45) Date of Patent: *Feb. 26, 2019

(54) METHODS AND SYSTEMS FOR REDUCING CHURN IN A CACHING DEVICE

(71) Applicant: HEWLETT PACKARD ENTERPRISE DEVELOPMENT LP, Houston, TX (US)

(72) Inventors: Umesh Maheshwari, San Jose, CA (US); Varun Mehta, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,429

(22) Filed: May 19, 2017

(65) Prior Publication Data

US 2017/0270048 A1   Sep. 21, 2017

Related U.S. Application Data

(63) Continuation of application No. 15/347,963, filed on Nov. 10, 2016, now Pat. No. 9,665,495, which is a
(Continued)

(51) Int. Cl.
*G06F 12/00* (2006.01)
*G06F 12/0888* (2016.01)
(Continued)

(52) U.S. Cl.
CPC ........ *G06F 12/0888* (2013.01); *G06F 3/0616* (2013.01); *G06F 3/0659* (2013.01);
(Continued)

(58) Field of Classification Search
CPC .. G06F 12/0888; G06F 3/0616; G06F 3/0659; G06F 3/0685; G06F 12/0246;
(Continued)

(56) References Cited

U.S. PATENT DOCUMENTS

| 4,571,674 A | 2/1986 | Hartung |
| 5,261,066 A | 11/1993 | Jouppi et al. |

(Continued)

OTHER PUBLICATIONS

M. Burrows, et al., "On-line Data Compression in a Log-structured File System", Proc. Fifth International Conference on Architectural Support for Programming Languages and Operating Systems (ASPLOS-V), Oct. 12-15, 1992, 27 pgs.

(Continued)

*Primary Examiner* — Larry T Mackall
(74) *Attorney, Agent, or Firm* — Hewlett Packard Enterprise Patent Department

(57) ABSTRACT

A storage device includes a flash memory-based cache for a hard disk-based storage device and a controller that is configured to limit the rate of cache updates through a variety of mechanisms, including determinations that the data is not likely to be read back from the storage device within a time period that justifies its storage in the cache, compressing data prior to its storage in the cache, precluding storage of sequentially-accessed data in the cache, and/or throttling storage of data to the cache within predetermined write periods and/or according to user instruction.

18 Claims, 2 Drawing Sheets

Related U.S. Application Data continuation of application No. 14/953,970, filed on Nov. 30, 2015, now Pat. No. 9,501,417, which is a continuation of application No. 14/473,992, filed on Aug. 29, 2014, now Pat. No. 9,235,506, which is a continuation of application No. 12/836,520, filed on Jul. 14, 2010, now Pat. No. 9,213,628.

(51) Int. Cl.
  *G06F 12/0866*   (2016.01)
  *G06F 12/02*    (2006.01)
  *G06F 3/06*     (2006.01)

(52) U.S. Cl.
  CPC ........ *G06F 3/0685* (2013.01); *G06F 12/0246* (2013.01); *G06F 12/0866* (2013.01); *G06F 2212/1036* (2013.01); *G06F 2212/1044* (2013.01); *G06F 2212/222* (2013.01); *G06F 2212/28* (2013.01); *G06F 2212/466* (2013.01); *G06F 2212/60* (2013.01); *G06F 2212/604* (2013.01); *G06F 2212/7202* (2013.01); *G06F 2212/7205* (2013.01)

(58) Field of Classification Search
  CPC ......... G06F 12/0866; G06F 2212/1036; G06F 2212/1044; G06F 2212/222; G06F 2212/28; G06F 2212/466; G06F 2212/60; G06F 2212/604; G06F 2212/7202; G06F 2212/7205
  See application file for complete search history.

(56) References Cited

U.S. PATENT DOCUMENTS

| | | |
|---|---|---|
| 5,627,992 A | 5/1997 | Baror |
| 5,699,552 A | 12/1997 | Whittaker |
| 5,761,706 A | 6/1998 | Kessler et al. |
| 5,860,091 A | 1/1999 | DeKoning et al. |
| 6,078,992 A | 6/2000 | Hum |
| 6,557,075 B1 | 4/2003 | Maher |
| 6,725,342 B1 | 4/2004 | Coulson |
| 6,892,173 B1 | 5/2005 | Gather et al. |
| 7,219,203 B2 | 5/2007 | Zohar et al. |
| 7,318,118 B2 | 1/2008 | Chu et al. |
| 7,603,530 B1 | 10/2009 | Liikanen et al. |
| 7,707,367 B1 | 4/2010 | Tran et al. |
| 8,065,481 B1 | 11/2011 | Hiller et al. |
| 8,583,865 B1 | 11/2013 | Sade et al. |
| 9,003,113 B2 | 4/2015 | Maheshwari et al. |
| 9,081,670 B2 | 7/2015 | Maheshwari et al. |
| 2005/0172067 A1 | 8/2005 | Sinclair |
| 2005/0198062 A1 | 9/2005 | Shapiro |
| 2006/0101206 A1 | 5/2006 | Wood et al. |
| 2007/0079070 A1 | 4/2007 | Piry et al. |
| 2007/0220227 A1 | 9/2007 | Long |
| 2007/0288692 A1 | 12/2007 | Bruce |
| 2008/0215800 A1 | 9/2008 | Lee et al. |
| 2008/0228992 A1 | 9/2008 | Dumitru et al. |
| 2009/0070527 A1 | 3/2009 | Tetrick |
| 2009/0240881 A1 | 9/2009 | Halloush et al. |
| 2010/0070689 A1 | 3/2010 | Lee |
| 2010/0082546 A1 | 4/2010 | Sreenivas |
| 2010/0138672 A1 | 6/2010 | Horie et al. |
| 2010/0146187 A1 | 6/2010 | Grimsrud et al. |
| 2010/0262721 A1 | 10/2010 | Asnaashari et al. |
| 2010/0274962 A1 | 10/2010 | Mosek et al. |
| 2011/0047437 A1 | 2/2011 | Flynn |
| 2011/0213924 A1 | 9/2011 | Ledford |
| 2012/0072661 A1 | 3/2012 | Cho |
| 2012/0117330 A1 | 5/2012 | Donley et al. |
| 2012/0215970 A1 | 8/2012 | Shats |
| 2014/0089584 A1 | 3/2014 | Pan |
| 2014/0115235 A1* | 4/2014 | Ito ..................... G06F 12/0868 711/103 |
| 2014/0359226 A1 | 12/2014 | Pan |

OTHER PUBLICATIONS

Response to Final Office Action filed Jan. 28, 2015, from U.S. Appl. No. 14/273,389, (filed May 8, 2014, 6 pgs.)

Office Action dated Jun. 4, 2014, from U.S. Appl. No. 14/273,367, (filed May 8, 2014), 16 pgs.

Response to Office Action filed Sep. 4, 2014, from U.S. Appl. No. 14/273,367, (filed May 8, 2014), 15 pgs.

Final Office Action dated Jan. 5, 2015, from U.S. Appl. No. 14/273,367, (filed May 8, 2014), 15 pgs.

Notice of Allowance dated Jun. 1, 2015, from U.S. Appl. No. 14/273,367, (filed May 8, 2014), 9 pgs.

Office Action dated Dec. 5, 2013, from U.S. Appl. No. 12/836,520, (filed Jul. 14, 2010), 21 pgs.

Response to Office Action filed Mar. 3, 2014, from U.S. Appl. No. 12/836,520, (filed Jul. 14, 2010), 11 pgs.

Final Office Action dated Jun. 18, 2014, from U.S. Appl. No. 12/836,520, (filed Jul. 14, 2010), 21 pgs.

Response to Final Office Action filed Sep. 11, 2014, from U.S. Appl. No. 12/836,520, (filed Jul. 14, 2010), 6 pgs.

Office Action dated Nov. 5, 2014, from U.S. Appl. No. 12/836,520, (filed Jul. 14, 2010), 13 pgs.

Amendment and Response to Office Action filed Mar. 31, 2015, from U.S. Appl. No. 12/836,520, (filed Jul. 14, 2010), 8 pgs.

Final Office Action dated Jul. 29, 2015, from U.S. Appl. No. 12/836,520, (filed Jul. 14, 2010), 6 pgs.

Response to Final Office Action filed Sep. 22, 2015, from U.S. Appl. No. 12/836,520, (filed Jul. 14, 2010), 4 pgs.

Notice of Allowance dated Oct. 5, 2015, from U.S. Appl. No. 12/836,520, (filed Jul. 14, 2010), 8 pgs.

Office Action dated Jun. 17, 2014, from U.S. Appl. No. 14/273,389, (filed May 8, 2014), 17 pgs.

Response to Office Action filed Sep. 17, 2014, from U.S. Appl. No. 14/273,389, (filed May 8, 2014), 19 pgs.

Final Office Action dated Jan. 15, 2015, from U.S. Appl. No. 14/273,389, (filed May 8, 2014), 11 pages.

IBM, "Method and Means of Ensuring Data Integrity With Removable NVRAM Cache", IBM Technical Disclosure Bulletin, NN RD431135 [online] Mar. 2000, [retrieved on Oct. 15, 2014], 2 pgs.

Office Action dated Oct. 23, 2014, from U.S. Appl. No. 14/473,992, (filed Aug. 29, 2014), 11 pgs.

Response to Office Action filed Jan. 22, 2015, from U.S. Appl. No. 14/473,992, (filed Aug. 29, 2014), 5 pgs.

Notice of Allowance dated Feb. 17, 2015, from U.S. Appl. No. 14/273,389, (filed May 8, 2014, 9 pgs.).

Final Office Action dated May 21, 2015, from U.S. Appl. No. 14/473,992, (filed Aug. 29, 2014), 13 pgs.

Response to Final Office Action filed Sep. 1, 2015, from U.S. Appl. No. 14/473,992, (filed Aug. 29, 2014), 5 pgs.

Notice of Allowance dated Nov. 24, 2015, from U.S. Appl. No. 14/473,992, (filed Aug. 29, 2014), 8 pgs.

Soundararajan; et al., "Extending SSD Lifetimes with Disk-Based Write Caches", Fast'10 Proceedings of the 8th USENIX conference on File and storage technologies (Feb. 23, 2010), 14 pages.

Notice of Allowance dated Jul. 19, 2016, from U.S. Appl. No. 14/953,970, (filed Nov. 30, 2015), 9 pages.

Amendment filed Apr. 12, 2016, from U.S. Appl. No. 14/953,970, (filed Nov. 30, 2015), 8 pages.

Non-Final Office Action dated Jan. 12, 2016, from U.S. Appl. No. 14/953,970, (filed Nov. 30, 2015), 12 pages.

Notice of Allowance dated Mar. 1, 2017, from U.S. Appl. No. 15/347,963, (filed Nov. 10, 2016), 8 pages.

Bhatia, S.; Varki, E.; Merchant, A, "Sequential Prefetch Cache Sizing for Maximal Hit Rate," Modeling, Analysis & Simulation of Computer and Telecommunication Systems (MASCOTS), 2010 IEEE International Symposium on, vol., No., pp. 89, 98, 17-19.

(56) References Cited

OTHER PUBLICATIONS

Non-Final Office Action dated Jul. 24, 2014, from U.S. Appl. No. 13/625,624 (filed Sep. 24, 2012), 21 pages.
Norton, A. et al., "Maximize the Performance of Microsoft Vista and Intel Matrix Raid," (Web Page), Aug. 21, 2009, <https://web.archive.org/web/20120504134923/http://www.techrepublic.com/blog/window-on-windows/maximize-the-performance-of-microsoft-vista-and-intel-matrix-raid/1461>.
Notice of Allowance dated Jan. 9, 2015, from U.S. Appl. No. 13/625,624 (filed Sep. 24, 2012), 8 pages.
Response to Office Action, filed Oct. 20, 2014, from U.S. Appl. No. 13/625,624 (filed Sep. 24, 2012), 8 pages.

* cited by examiner

METHODS AND SYSTEMS FOR REDUCING CHURN IN A CACHING DEVICE

RELATED APPLICATIONS

This application is a Continuation of U.S. application Ser. No. 15/347,963 filed on Nov. 10, 2016 (now issued as U.S. Pat. No. 9,665,495), which is a Continuation of U.S. application Ser. No. 14/953,970 filed on Nov. 30, 2015 (now issued as U.S. Pat. No. 9,501,417), which is a Continuation of U.S. application Ser. No. 14/473,992 filed on Aug. 29, 2014 (now issued as U.S. Pat. No. 9,235,506), which is a Continuation of U.S. application Ser. No. 12/836,520 filed on Jul. 14, 2010 (now issued as U.S. Pat. No. 9,213,628), all of which are incorporated herein by reference.

FIELD OF THE INVENTION

The present invention relates to the use of a flash memory-based cache for a hard disk-based storage device and, in particular, to techniques for limiting the rate of cache updates, also known as "churn", in such a device.

BACKGROUND

Hard disk drives (HDD), or simply hard disks, are found in many computers and dedicated storage appliances. Hard disks can offer significant available storage space (e.g., on the order of terabytes), but the speed at which data can be read from such devices is limited by physical properties such as the speed at which the disk(s) rotate, and the time required for the read head to be maneuvered into the correct position to read the requested data information elements (the so-called seek time).

Solid state storage devices, typically those that employ flash memory as the storage medium, offer improved read times compared to hard disks, in part because there are no moving parts associated with such a device. Write times, however, are often worse than those associated with hard disks because flash memory can only be written in relatively large "erase block" sizes (e.g., typically 128 KB-512 KB), which must be erased and rewritten in their entirety even if only a small amount of data within the block needs to be updated.

Today, storage devices that employ both flash memory and hard disks are being marketed. In some instances, the flash memory portion of these devices is being used as a cache for data stored on the hard disk. A cache is generally regarded to be a storage area that holds a subset of the data stored on a larger, generally slower, storage medium. The flash memory provides lower latency and serves higher numbers of requests per second than the hard disks and so data stored in the cache portion of the storage device can be delivered more rapidly than if the data had to be accessed from the hard disks. However, updating the cache requires writing to the flash memory, which has drawbacks. As noted above, the flash memory is comparatively slow to write, especially when it must be written randomly to replace the "coldest" (e.g., least frequently accessed or least likely to be needed) data in the cache. Hence, writes to a flash-based cache can slow down concurrent reads from the storage device, thus reducing the benefit of caching. In addition, flash memory has limited write endurance. Typically, flash blocks wear out after 10,000 to 100,000 writes.

SUMMARY OF THE INVENTION

Recognizing that issues such as the comparatively slow write times and limited write endurance of flash memories provide an incentive to reduce the rate of updates to a flash-based cache, the present inventors have developed methods and systems for limiting the rate of cache updates in a storage device having a flash memory-based cache and a disk-based storage unit.

For example, in some instances, a controller of the storage device selectively writes-through data received at the storage device to both the cache and the disk-based storage unit if the controller determines the data is likely to be read back non-sequentially from the storage device within a time period that justifies its storage in the cache; otherwise, if a previous version of the data exists in the cache, the controller writes the data only to the disk-based storage unit and invalidates the previous version of the data in the cache; else, if no previous version of the data exists in the cache, the controller writes the data only to the disk-based storage unit. The controller may determine whether or not the data is likely to be read back from the storage device within the time period that justifies its storage in the cache according to statistics concerning past accesses that have been gathered by the controller.

If the controller does determine that the data is not likely to be read back within the time period that justifies its storage in the cache, and the previous version of the data exists in the cache, then the controller may invalidate the previous version of the data in the cache by storing an address of the previous version of the data that exists in the cache in an invalidate buffer of a non-volatile RAM (NVRAM) of the storage device. Such invalidations of previously stored versions of data written to the cache stored in the invalidate buffer may be committed to the cache when the invalidate buffer is filled.

Alternatively, or in addition to the above, data to be stored in the storage device may be compressed prior to being written to the flash memory-based cache. Such compression may produce variable sized blocks of data, which are subsequently written to the cache.

In still further examples, data to be stored in a storage device may be initially written to a flash memory-based cache and a disk-based storage unit of the storage device, however, if the amount of data being written sequentially exceeds a predetermined threshold, a controller may stop writing data to the cache and write the data only to the disk-based storage unit.

In still other examples, cache updates may be throttled when a storage device controller determines that a threshold number of permitted writes for a given write period has been reached and refuses further writes to a cache of the storage device for the duration of that write period. Each subject write period may be a period of fixed interval. Alternatively, or in addition, the controller may throttle updates to the cache in accordance with user input concerning whether or not the data is to be cached.

These and further embodiments of the present invention are discussed below.

BRIEF DESCRIPTION OF THE DRAWINGS

The present invention is illustrated by way of example, and not limitation, in the figures of the accompanying drawings in which.

DETAILED DESCRIPTION

Recognizing the advantages afforded by incorporating both a flash memory-based cache and one or more hard disks in a common storage device, the present inventors have devised such a storage device in which a controller (or cache management module) is configured to limit the rate of cache updates, a.k.a. churn. In accordance with the present invention, while the controller is configured to permit some "hot" (e.g., frequently accessed or likely to be needed) data to be stored in the cache, not all such data is permitted to be so stored. This avoids wasteful, even counter-productive situations which may arise when all hot data is stored in a flash-based cache. The techniques for limiting churn that are discussed herein may be applied in combination with one another within a single storage device, or they may be applied independently of one another.

Figure 1:
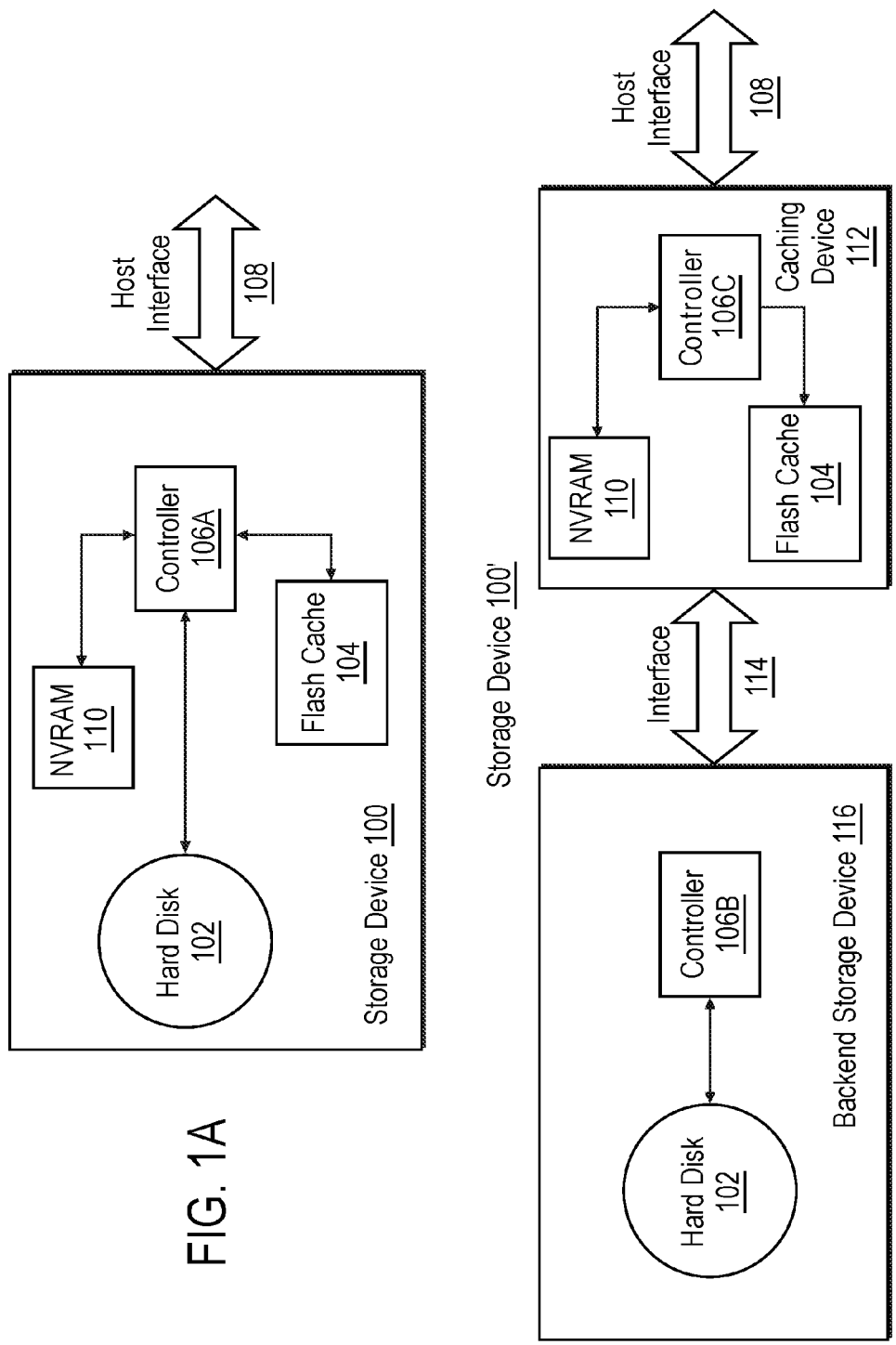
FIG. 1A illustrates an example of a storage device in which embodiments of the present invention may be instantiated.
FIG. 1B illustrates a further example of a storage device in which embodiments of the present invention may be instantiated.

FIG. 1A shows an example of a storage device 100 in which embodiments of the present invention may be instantiated. Storage device 100 includes one or more hard disks 102 and a flash memory-based cache 104. The disks and/or the flash memory cache may be included in an integrated storage device 100 or attached as separate devices (see e.g., the embodiment illustrated in FIG. 1B). The disks 102 and flash memory-based cache 104 are under the control of a controller 106A, which may include firmware that instantiates the techniques for minimizing churn discussed herein. Storage device 100 is accessible (e.g., to applications running on a host machine) via a host interface 108, which may, in general, conform to specifications for disk-based storage devices common in the industry (e.g., an advanced host controller interface that uses a serial ATA bus, a small computer system interface (SCSI) or variants thereof, or an Internet protocol-based protocol, etc.). Except where particular protocols are called out, the systems and methods disclosed herein do not depend on the particular protocol being used and storage devices configured in accordance with the present invention can be configured to operate correctly with all of them.

Controller 106A is, in some embodiments of the invention, configured such that cache management operations include any or all of: compressing data before it is committed to the flash memory-based cache, avoiding caching of sequentially-accessed data (i.e., data that is likely to be read back sequentially), selective write through caching, and throttling cache updates based on the amount of data previously written to the cache. Each of these techniques is discussed in greater detail below. A non-volatile random access memory (NVRAM) 110 is accessible to controller 106A and may be used to store invalidation information, as discussed below.

FIG. 1B illustrates an alternative example of a storage device 100', which includes a backend storage device 116, having a hard disk, and a caching device 112, having a flash memory-based cache, communicatively coupled with one another by an interface 114. In this example, each of the backend storage device and the caching device employ a controller, 106B and 106C, respectively. Controller 106B is configured to manage storing operations involving hard disk 102, while controller 106C is configured to manage storage operations for the storage device 100' in the manner described above for controller 106A. Thus, storage operations involving the hard disk and the flash memory-based cache may be distributed across multiple physical devices, but managed in accordance with the present invention.

Before describing the techniques for minimizing churn in detail, it is helpful to define some terms that will appear in this description. For example, when we use the term cache update, we mean an update that occurs either on a read miss or a write. A read miss occurs when the data requested in a read is not present in the cache and must be fetched from the backing medium. A write occurs when data is written to the cache. Such writes may be governed by any of several policies that dictate the manner or time at which data written to the storage device is written to the cache and the backing storage medium (e.g., the hard disks). Appropriate use of a cache write policy in accordance with the present invention is useful in reducing churn arising from writes.

In a "write-through" cache, every write to the storage device causes a synchronous write to the cache and the backing storage medium. This technique imposes a high write rate on cache, hence it is not well-suited for flash memory-based cache which has limited write endurance.

In a write-back cache, writes are not immediately mirrored to the backing storage medium. Instead, data is buffered in the cache for a period of time and written back to storage later, for example when some data must be evicted from the cache to make space for new data. For a device incorporating a flash memory-based cache for data stored on disk, this technique has two drawbacks. First, it requires the cache to be loss-less, since the cache includes dirty data that is not yet stored on disk. Second, it imposes a high write rate because all writes must go to the cache. In practice, flash memory is known to be unreliable (and so cannot be guaranteed to be loss-less) and, as indicated above, has limited write endurance.

In contrast to write-through and write-back schemes, in a "write-invalidate" cache, written data is not entered in the cache at all and is stored directly on backing storage medium. New data is put in cache only on read misses, never on writes. If an older version of the written data is present in the cache (because of a prior read), that older version is invalidated. This technique does not impose a high write rate on flash—at least not because of data writes—however, it has the drawback that the first data read after a data write misses in the cache.

Figure 2:
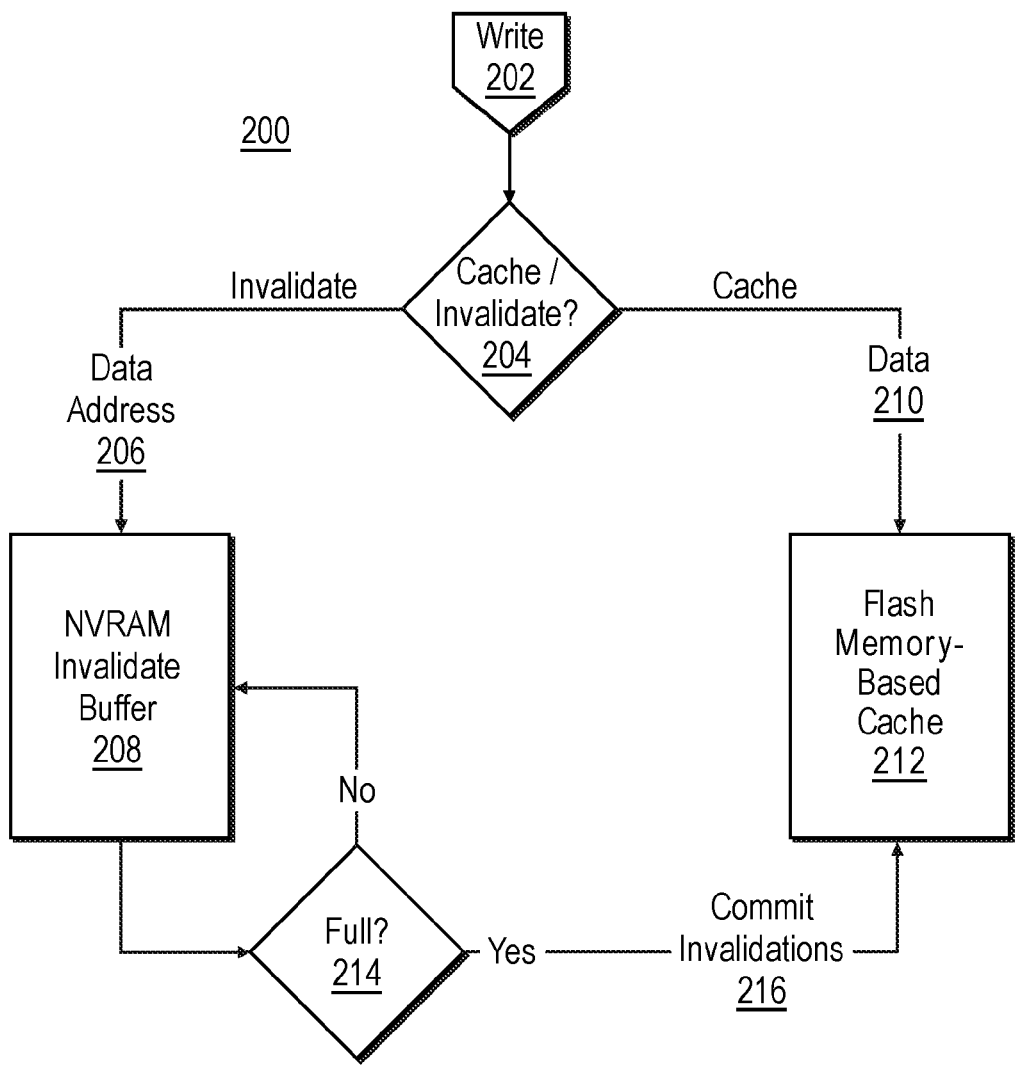
FIG. 2 illustrates an example of a selective write-through operation in a storage device configured in accordance with an embodiment of the present invention.

In one embodiment, the present invention provides a "selective write through" cache. In this scheme, which applies to cache updates on writes but not on read misses, data that is likely to be read back soon, and in a non-sequential fashion, is entered in the cache. Other data is merely invalidated in the cache (if its older version exists in the cache), using an invalidate buffer in the NVRAM as an aid. As discussed further below, it is desirable to cache only that data which is likely to be read back non-sequentially, inasmuch as hard disks provide roughly equal performance as flash for sequentially-accessed data. Therefore, the selective write-through process is applied in cases of writes involving data likely to be read back soon, and in a non-sequential fashion. FIG. 2 illustrates an example of such a selective write-through operation 200.

Writes 202 that are presented to a storage device controller (such as controller 106A or controller 106B) are examined to determine whether the data involved in the write is data that should be cached. For example, the controller determines whether the data is likely to be read back non-sequentially and within a time period that justifies its storage in the cache. This may be done based on statistics concerning past accesses that have been gathered by the storage device controller and/or information concerning the type of data involved in the write (e.g., log data is rarely read back, if ever), etc. If the storage device controller determines that the data is not a good candidate for caching (i.e., is sequentially-accessed data, is not likely to be read back within this predetermined time period, is of a type not likely to be read back, etc.), then the address of that data (if a copy thereof already exists in the cache) 206 is stored, persistently and efficiently, in an invalidate buffer 208 in the NVRAM 110. If no copy of the write data exists in the cache, no address information need be stored in the invalidate buffer. In either case, the data itself is not written to the cache, but it is written to the backing storage media (e.g., hard disk 102).

The NVRAM is generally smaller (e.g., on the order of a few GB) than the flash based cache (which is, e.g., typically on the order of hundreds of GB), but it can withstand significant churn because it is RAM-based. Since invalidations contain only data addresses, not the data itself, they are relatively small data objects and can be stored efficiently in the NVRAM. In the unlikely case that the NVRAM is lost, the flash cache can be purged to ensure that the cache does not serve stale data. Because the data exists on the backing storage media, it is not lost in such an event.

Returning to FIG. 2, if the data storage device controller determines that the data is likely to be read back relatively soon (there need not be a defined time limit and the relative timeframe for likely read back may be based on observed statistics of the controller), then that data 210 is stored in the flash cache 212 and synchronously written to the backing storage medium (e.g., hard disk 102). Hence the write-through nature of this write policy.

Eventually, the NVRAM invalidate buffer may become filled 214. When this occurs, the invalidations are applied to the flash cache 216. This involves a write, but overall the number of writes is reduced from that which would otherwise be the case and so overall churn is reduced.

While the above-described selective write-through policy only applies to cache updates involving writes, the remaining churn-avoidance techniques discussed below may be applied to any form of cache update, e.g., both read misses and writes (and, where used, cache prefetches as well). For example, embodiments of the present invention may make use of data compression when dealing with cache updates. In particular, data associated with a cache update is compressed before being stored in the flash memory-based cache. The compression may be applied by a storage device controller) such as controller 106A or 106C, or other processing unit of the subject storage device. Using data compression in this manner has at least two advantages: First, data compression increases the effective size of the cache, thereby allowing for increased hit rates (i.e., increased likelihoods that requested data will be found in the cache). Second, by reducing the amount of data written to the flash memory, the data compression extends the life of the flash memory (i.e., since more data can be accommodated in the cache, fewer writes are required per unit of data to be stored, hence, the limited endurance of the flash memory is not tested as quickly as might otherwise be the case).

Compressing data prior to storage in flash memory is not straightforward because it results in variable-size blocks. Typically, flash memory can only be written in relatively large, fixed block sizes (e.g., typically 128 KB-512 KB), which must be erased and rewritten in their entirety even if only a small amount of data within the block needs to be updated. However, the present invention accommodates the use of variable sized blocks by using a "log structured" cache.

In a log-structured file system, the main data structure on the storage medium is a sequentially written log. New data, including modifications to existing blocks, is written to the end of the log. In accordance with the present techniques, the log is compressed as it is written to the flash cache. In this scheme, no blocks are overwritten, hence, it does not matter if new data does not compress to blocks of the same size as existing data. Because blocks are written sequentially, the compressed blocks can be packed tightly together in the flash memory, eliminating fragmentation. Some metadata concerning the location of where the compressed blocks are stored in the flash cache must also be kept. In some instances, this metadata may be stored in the NVRAM for efficiency.

In one embodiment of the present invention, a g-zip style compression is employed, however, any compression scheme may be used. In addition, the controller is configured to perform "garbage collection" to ensure that large segments of the flash array are kept available for the contiguous writes required for proper coalescing of the variable blocks.

As mentioned above, in embodiments of the present invention the controller is configured to avoid caching sequentially-accessed data. For large sequential accesses (say, larger than 1 MB), hard disks provide performance that is approximately similar to that offered by flash memory (e.g., on the order of 100-200 MB/s). Therefore, there is little incentive to enter such data in the flash memory-based cache. The storage device controller is therefore configured with various heuristics to predict sequentially and to avoid caching sequentially-accessed data.

For example, the controller may be configured to recognize that if some data is currently being accessed sequentially, that same data is likely to be accessed sequentially in the future. Accordingly, the controller may start by writing data to the cache, monitoring the size of the write. If the sequential write grows beyond a certain threshold size (e.g., on the order of 1 MB or so), the controller may determine the associated data to be sequentially-accessed data and to stop writing the data to the flash memory-based cache. Such data would, instead, be written only to the disk(s).

Still further embodiments of the present invention provide for throttling cache updates based on the amount of data written previously. As noted above, flash memory has limited endurance for writes. On the other hand, users expect a certain amount of life for storage appliances, e.g., 5 years. To increase the likelihood that the flash memory-based cache will survive for its intended lifetime, the storage device controller is configured to throttle updates to the cache to a specified number over a defined write period. The threshold number of permitted writes per write period can be updated periodically, for example, each write period, to ensure that the cache is being managed efficiently. For example, if it is the case that for several write periods the threshold number of writes was not being met, then the controller may distribute the excess capacity across the remaining lifetime of the storage device so as not to unnecessarily prevent use of the cache during write periods of increased write activity.

Throttling of cache updates in this fashion may be accomplished as follows: The expected lifetime of the storage device is divided into shorter but convenient periods of fixed interval, say one week ("write periods"). (Selecting intervals that are too short, such as one minute might constrain update rates unnecessarily.) The controller is configured to keep track of the number of writes made to the cache since being placed in service and the accumulated in-service time for the storage device (e.g., as a measure of its expended, expected lifetime). Then, the controller determines the number of permitted writes per write period by dividing the number of further writes that can be tolerated (e.g., determined by subtracting the number of writes to date from the total number of writes that can be tolerated) into the number of write periods left in the expected service lifetime for the storage device. The result is the threshold number of permitted writes per write period.

Over the succeeding write period, the controller monitors the number of writes to the flash cache and allows, at most, a number of writes equal to the threshold number of permitted writes. Any further attempted updates to the cache during this write period are refused. As indicated above, in the case of writes this means invalidating data instead of writing through.

Still a further technique for reducing churn in a flash memory-based cache in accordance with embodiments of the invention is to rely on user input concerning the nature of data being written to the storage device. That is, in some instances a user may indicate that a certain dataset should not be cached (e.g., by signaling the storage device controller through a management interface or other means, or by including metadata with the dataset being stored, which metadata can be parsed by the controller to determine its data type). By way of example, a user may indicate that a dataset comprise of a database log should not be cached because the log is generally not read, and, when it is read, it is read sequentially.

In various embodiments of the invention, the foregoing techniques for reducing churn may be applied individually or in any combination with one another. Accordingly, storage device controllers may be configured to implement any or all of the techniques discussed herein, for example according to user configuration instructions when placing a storage device in service or otherwise managing the device. In some instances, the storage device controller may be configured to apply different ones of the above-described techniques at different times (e.g., according to the number of writes to the flash cache in the aggregate or over a given period of time, time of day, day of week/month, etc.). The techniques are not mutually exclusive of one another, nor do they depend on one another for their instantiation in a storage device.

Thus, storage devices that incorporate controllers or cache management modules configured to limit the rate of cache updates, or churn, have been described. As should be evident from the foregoing description, various embodiments of the present invention may be implemented with the aid of computer-implemented processes or methods (a.k.a. programs or routines) that may be rendered in any computer language. Such processes are meant to encompass any series of logical steps performed in a sequence to accomplish a given purpose. The operations of the storage device controller were discussed in terms of algorithms and operations on data within a memory or buffer and these algorithms and operations were intended to convey the nature of computer programs sufficient to direct the operations of the storage device controller to perform the desired tasks. Hence, it should be appreciated that the use of terms such as "processing", "computing", "calculating", "determining", "displaying" or the like, refer to the action and processes of the storage device controller described herein, or an appropriately programmed computer system, or similar electronic computing device, for example that manipulates and transforms data. The computer program that embodies these processes may be stored in a computer readable storage medium, such as, but not limited to, any type of disk including floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EEPROMs), flash memories, other forms of magnetic or optical storage media, or any type of media suitable for storing electronic instructions, and accessible to the storage device controller.

What is claimed is:

1. A method for a storage device having a caching device and a backend storage device, the method comprising:
   receiving data at the storage device, the data including sequentially-accessed data; and
   performing, by a controller of the storage device, a selective caching of the sequentially-accessed data, wherein the selective caching comprises:
      if the sequentially-accessed data can be read from the backend storage device at a substantially similar data rate as from the caching device, writing the sequentially-accessed data only to the backend storage device so as to reduce the amount of data written to the caching device; and
      if the sequentially-accessed data cannot be read from the backend storage device at a substantially similar data rate as from the caching device, writing the sequentially-accessed data to both the caching device and the backend storage device.

2. The method of claim 1, wherein a size of the sequentially-accessed data is greater than 1 megabyte (MB).

3. The method of claim 1, wherein the selective caching of the sequentially-accessed data comprises a selective write-through caching of the sequentially-accessed data.

4. The method of claim 1, wherein the selective caching of the sequentially-accessed data is applied on writes but is not applied on read misses.

5. A storage device, comprising:
   a controller; and
   a memory that stores instructions that, when executed by the controller, cause the controller to:
      receive data to be stored in the storage device;
      write an initial portion of the data to a caching device and a backend storage device;
      while the initial portion is being written to the caching device and the backend storage device, monitor an amount of the initial portion that has been written sequentially;
      determine whether the amount that has been written sequentially exceeds a predetermined threshold beyond which the data can be read from the caching device at a substantially similar data rate as from the backend storage device; and
      if so, predict that the data is to be sequentially accessed, cease writing of the data to the caching device and write the remaining portion of the data only to the backend storage device so as to reduce the amount of data written to the caching device.

6. The storage device of claim 5, wherein the received data comprises compressed data.

7. The storage device of claim 5, wherein the memory stores instructions that, when executed by the controller, cause the controller to compress the received data prior to writing the compressed data to the caching device.

8. The storage device of claim 7, wherein the compression of the received data by the controller produces variable sized blocks of data.

9. The storage device of claim 5, wherein the memory stores instructions that, when executed by the controller, cause the controller to throttle updates to the caching device by permitting only a threshold number of writes per write period to the caching device, wherein each write period comprises a period of fixed interval.

10. The storage device of claim 5, wherein the memory stores instructions that, when executed by the controller, cause the controller to throttle updates to the caching device in accordance with user instructions concerning whether or not the data is to be cached.

11. The storage device of claim 5, wherein the memory stores instructions that, when executed by the controller, cause the controller to throttle updates to the caching device in accordance with user instructions concerning a data type of the data.

12. A non-transitory computer-readable storage medium including a set of instructions stored thereon, which when executed by a storage device cause the storage device to:
   receive data to be stored in the storage device, the storage device having a caching device and a backend storage device;
   write an initial portion of the data to the caching device and the backend storage device;
   while the initial portion is being written to the caching device and the backend storage device, monitor an amount of the initial portion that has been written sequentially;
   determine whether the amount that has been written sequentially exceeds a predetermined threshold beyond which the data can be read from the caching device at a substantially similar data rate as from the backend storage device; and
   if so, predict that the data is to be sequentially accessed, cease writing of the data to the caching device and write the remaining portion of the data only to the backend storage device so as to reduce the amount of data written to the caching device.

13. The non-transitory computer-readable storage medium of claim 12, further including instructions, which when executed by the storage device cause the storage device to compress the received data prior to writing the compressed data to the caching device.

14. The non-transitory computer-readable storage medium of claim 13, wherein the compression of the received data by the controller produces variable sized blocks of data.

15. The non-transitory computer-readable storage medium of claim 12, further including instructions, which when executed by the storage device cause the storage device to throttle updates to the caching device by permitting only a threshold number of writes per write period to the caching device, wherein each write period comprises a period of fixed interval.

16. The non-transitory computer-readable storage medium of claim 12, further including instructions, which when executed by the storage device cause the storage device to throttle updates to the caching device in accordance with user instructions concerning whether or not the data is to be cached.

17. The non-transitory computer-readable storage medium of claim 12, further including instructions, which when executed by the storage device cause the storage device to throttle updates to the caching device in accordance with user instructions concerning a data type of the data.

18. The non-transitory computer-readable storage medium of claim 12, wherein the received data comprises compressed data.

* * * * *